US011391331B2

United States Patent
Bucknor et al.

(10) Patent No.: US 11,391,331 B2
(45) Date of Patent: Jul. 19, 2022

(54) ENGINE START/STOP CONTROL FOR A HYBRID ELECTRIC POWERTRAIN

(71) Applicant: GM GLOBAL TECHNOLOGY OPERATIONS LLC, Detroit, MI (US)

(72) Inventors: Norman K. Bucknor, Troy, MI (US); Chunhao J. Lee, Troy, MI (US); Neeraj S. Shidore, Novi, MI (US); Dongxu Li, Troy, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 403 days.

(21) Appl. No.: 16/734,971

(22) Filed: Jan. 6, 2020

(65) Prior Publication Data

US 2021/0207666 A1    Jul. 8, 2021

(51) Int. Cl.
*F16D 48/06* (2006.01)
*B60W 30/18* (2012.01)
(Continued)

(52) U.S. Cl.
CPC ............ *F16D 48/06* (2013.01); *B60W 10/02* (2013.01); *B60W 20/40* (2013.01);
(Continued)

(58) Field of Classification Search
CPC .......... F16D 48/06; F16D 2500/10412; F16D 2500/3108; F16D 2500/3144; F16D 2500/3161; F16D 2500/50227; F16D 2500/50883; F16D 2500/70424; B60W 10/02; B60W 10/06; B60W 10/08; B60W 20/40; B60W 30/18018; B60W 2050/0026; B60W 2520/10; B60W 2540/10; B60W 2710/021
See application file for complete search history.

(56) References Cited

U.S. PATENT DOCUMENTS

| 9,597,979 | B1 * | 3/2017 | Hao ..................... B60K 6/387 |
| 2012/0203417 | A1 * | 8/2012 | Matsui .................. B60W 10/02 180/65.265 |

(Continued)

*Primary Examiner* — Edwin A Young
(74) *Attorney, Agent, or Firm* — Quinn IP Law

(57) ABSTRACT

A controller executes a method to manage an engine connect/disconnect decision in a powertrain having an engine, transmission, electric machine, and a battery pack and power inverter module ("TPIM"). In response to vehicle ground speed being less than a calibrated maximum electric vehicle accelerator pedal signal ("$EV_{APS}$") level, the controller calculates a delta APS ("$\Delta APS$") value by subtracting a scaled APS value from the actual APS level. The scaled APS value is a scaled variant of a maximum $EV_{APS}$ value selected from a maximum $EVS_{APS}$ table, the latter populated based on inverter temperature, state of charge of the battery pack, and ground speed. When the $\Delta APS$ value exceeds a threshold, the controller connects the engine to the transmission via an engine disconnect clutch. The engine is disconnected based on acceleration of the vehicle and the above-noted factors.

20 Claims, 7 Drawing Sheets

(51) Int. Cl.
*B60W 10/02* (2006.01)
*B60W 20/40* (2016.01)
*B60W 50/00* (2006.01)

(52) U.S. Cl.
CPC ......... *B60W 30/18018* (2013.01); *B60W 2050/0026* (2013.01); *B60W 2510/244* (2013.01); *B60W 2520/10* (2013.01); *B60W 2540/10* (2013.01); *B60W 2710/021* (2013.01); *F16D 2500/10412* (2013.01); *F16D 2500/3108* (2013.01); *F16D 2500/3144* (2013.01); *F16D 2500/3161* (2013.01); *F16D 2500/50227* (2013.01); *F16D 2500/50883* (2013.01); *F16D 2500/70424* (2013.01)

(56) References Cited

U.S. PATENT DOCUMENTS

| | | | |
|---|---|---|---|
| 2015/0329105 A1* | 11/2015 | Matsui | B60K 6/547 180/65.265 |
| 2016/0244050 A1* | 8/2016 | Ouchi | B60W 30/194 |
| 2017/0227075 A1* | 8/2017 | Ortmann | B60W 30/18127 |

* cited by examiner

ENGINE START/STOP CONTROL FOR A HYBRID ELECTRIC POWERTRAIN

INTRODUCTION

The present disclosure relates to control of engine start/stop functionality in a hybrid electric powertrain. In the types of powertrains contemplated herein, input torque to a transmission may include torque from an internal combustion engine ("engine torque") and/or one or more rotary electric machines ("motor torque"), with the torque composition being drive mode-specific. When the transmission input torque is composed exclusively of motor torque, the drive mode is referred to in the art as an electric vehicle ("EV") mode. Drive modes in which the engine is running and actively providing some or all of the transmission input torque are referred to herein as "engine-connected" modes.

The ability of a hybrid controller to supplement or replace available engine torque with motor torque from the rotary electric machine(s) enables a hybrid electric powertrain to reduce reliance on fossil fuels or alternative fuels relative to powertrains that rely solely on engine torque. For instance, during an engine auto-stop event in a vehicle employing the hybrid electric powertrain, the controller may request an engine-disconnect, resulting in decoupling of the engine from the transmission and a cutoff of the engine's fuel feed, after which the engine's rotational speed decreases. A true engine-off state exists when the engine speed reaches zero. A starter motor or one of the powertrain's electric machines may be used to quickly crank and start the engine when the controller determines that engine torque is required.

SUMMARY

Methodologies and associated power flow architectures are described herein for use with a hybrid electric powertrain having an internal combustion engine, a rotary electric machine, and a transmission. A hydrokinetic torque converter and/or a disconnect clutch disposed between the engine and an input shaft of the transmission enables the engine to be selectively connected or disconnected from the transmission as needed depending on the current drive mode. The electric machine is powered via a traction power inverter module ("TPIM") and a high-voltage battery pack, with a rotor shaft of the electric machine directly connected to the input member of the transmission in disclosed embodiments of the powertrain.

The present control strategy is used to manage mode transitions between an electric-only/electric vehicle ("EV") drive mode in which the transmission is powered solely via motor torque from the electric machine, and a drive mode in which the engine is actively fueled and running ("engine-connected mode"). The electric machine may or may not also provide at least some of the input torque to the transmission during the engine-connected mode.

As described herein, a hybrid controller manages the overall engine connect/disconnect decision for the powertrain when faced with limited electric drive power, with the present method seeking to minimize driveline disturbances while maximizing fuel economy under such limited power conditions. Electric drive power may be limited due to various factors, such as but not necessarily limited to elevated operating temperature and/or electric operating duration of the TPIM and electric machine, or simply due to a purposeful undersized configuration of the electric machine and its associated power electronics, for instance a lower-power high-efficiency drive system.

Current methods for managing an engine on/off decision tend to utilize optimization strategies based on a set of system constraints and current driver demand. For example, the controller of a typical hybrid electric vehicle may decide when to turn the engine on or off based on results of a system loss minimization formula. In contrast, the present approach dynamically adjusts the engine-off driving envelope in response to an accelerator pedal signal ("APS"), i.e., a percentage of travel of an accelerator pedal or another suitable torque request input device, a state of charge ("SOC") of the battery pack, current vehicle ground speed, and the temperature of the TPIM ("inverter temperature"). Additionally, the controller considers dynamic long-term motor torque limits and operating temperature of the electric machine, which may be communicated to the controller by a motor control processor ("MCP") in real-time. The controller ultimately makes the engine connection/disconnection decision based on the relevant factors.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

Figure 1:
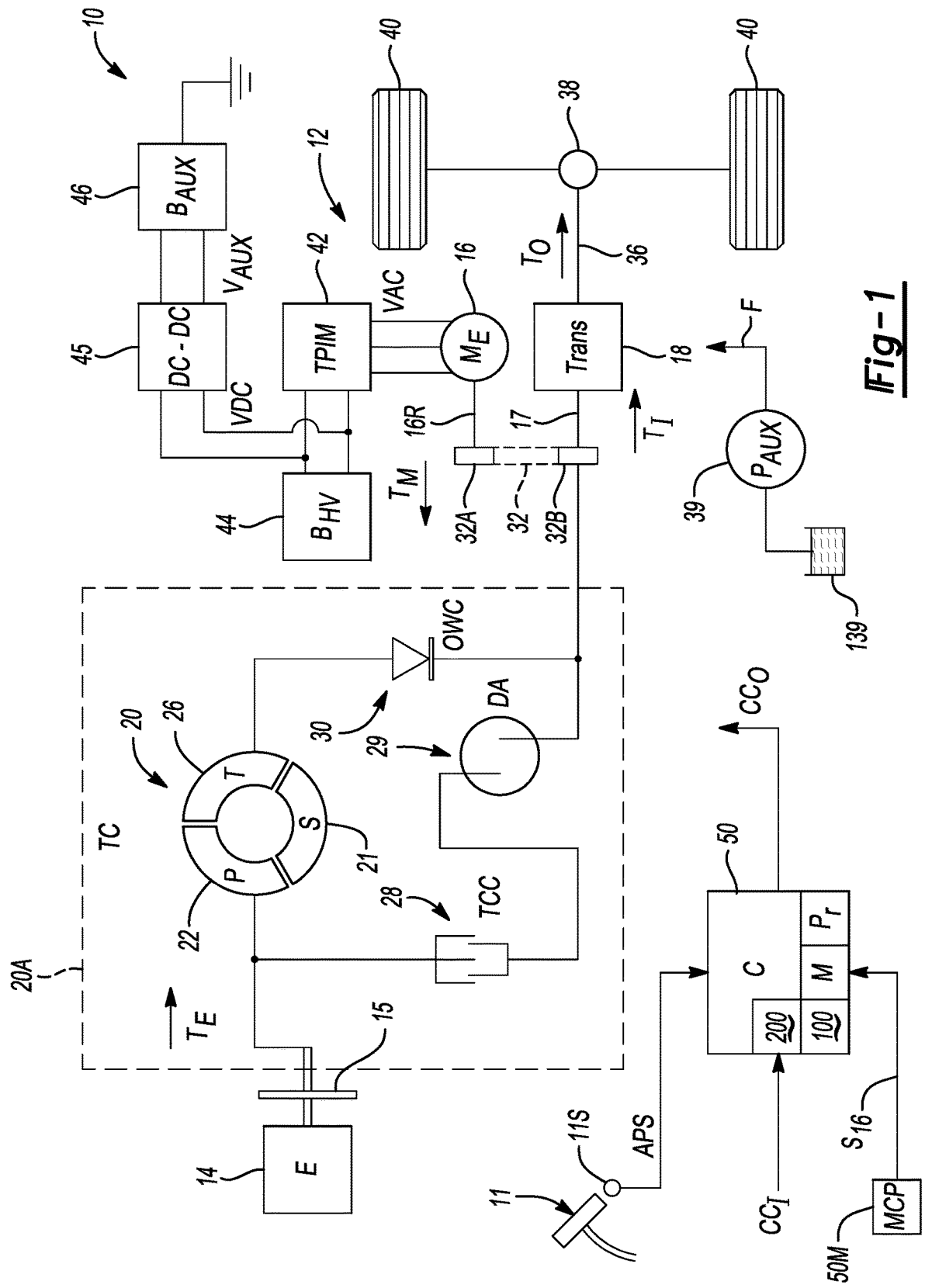
FIG. 1 is a schematic illustration of a representative motor vehicle having a hybrid electric powertrain in which an engine connect/disconnect decision is controlled in accordance with the present disclosure.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like features throughout the several views, a motor vehicle 10 having a hybrid electric powertrain 12 is depicted schematically in FIG. 1. The powertrain 12 includes multiple torque sources suitable for use in propelling the vehicle 10, which in the illustrated embodiment include an internal combustion engine ("E") 14 and a rotary electric machine ("$M_E$") 16. While one electric machine 16 is shown as part of the representative powertrain 12, the powertrain 12 may include additional electric machines in other embodiments, and therefore the singular electric machine 16 is non-limiting and illustrative of the present teachings.

Figure 4:
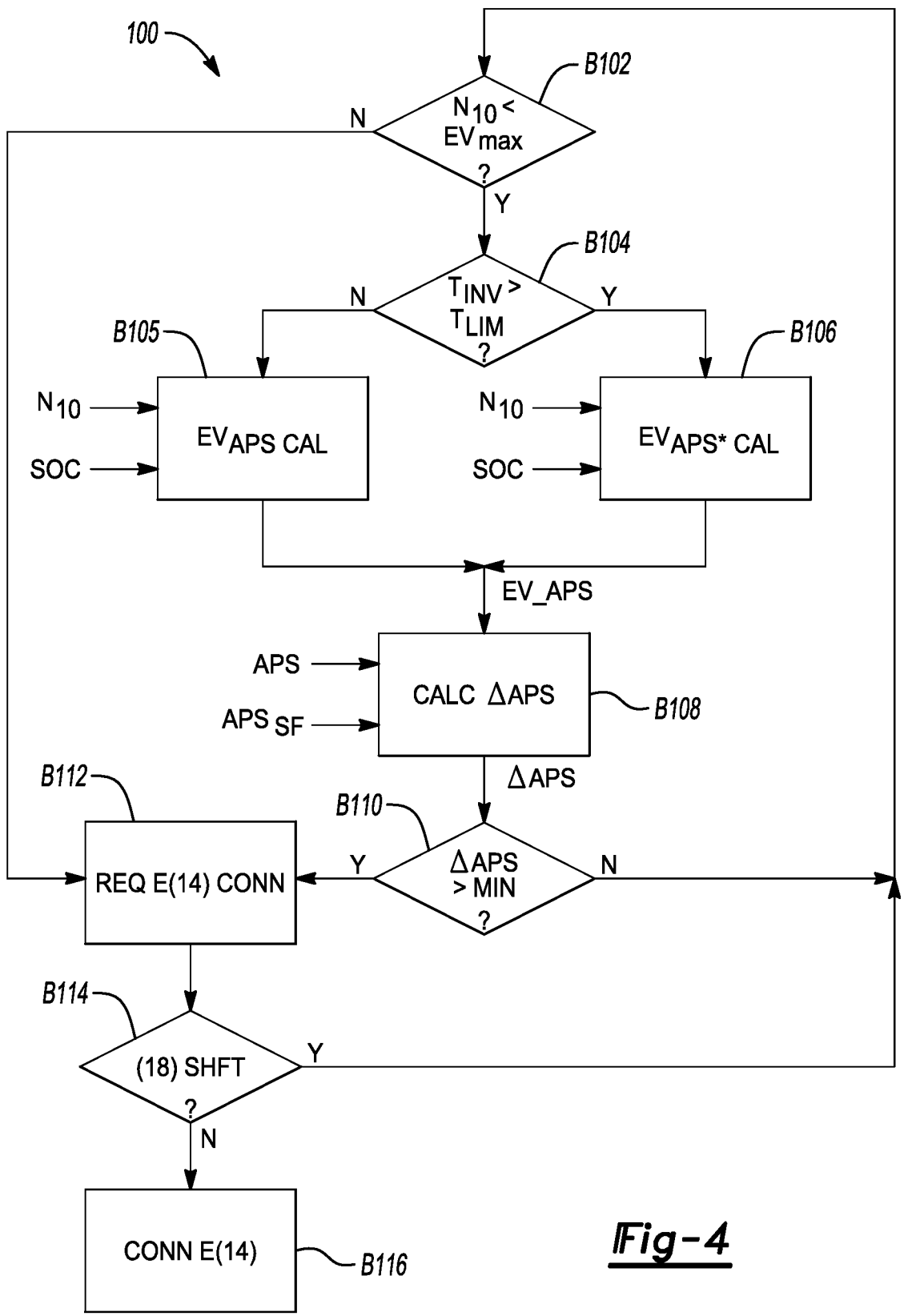
FIG. 4 is a flow chart describing a method for controlling an engine-connected decision in accordance with the present disclosure.
Figure 6:
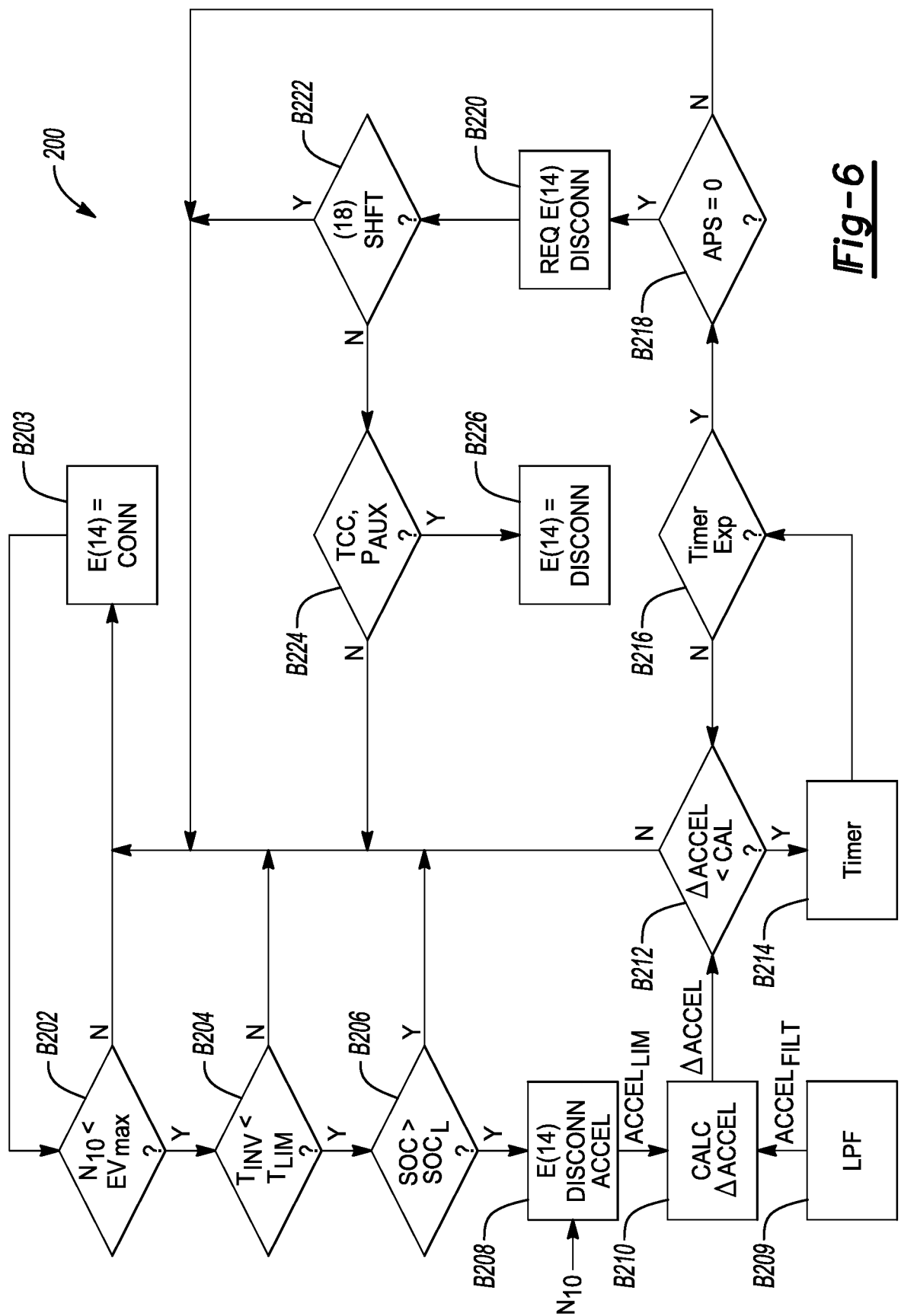
FIG. 6 is a flow chart describing a method for controlling an engine-off decision in the exemplary electrified powertrain of FIG. 1.

The operating states of the engine 14 and the electric machine 16 are individually and cooperatively controlled via an onboard hybrid controller ("C") 50, with the controller 50 controlling such states, and in particular an on/off state of the engine 14, via methods 100 and 200, respectively. Methods 100 and 200, exemplary embodiments of which are respectively depicted in FIGS. 4 and 6, are described separately herein for illustrative clarity, but may be implemented as one cohesive set of control logic.

To that end, the controller 50 is equipped with a processor ("Pr") and sufficient memory ("M"), i.e., tangible, non-transitory memory such as read only memory, which may be optical, magnetic, flash, etc. The controller 50 also includes application-sufficient amounts of random-access memory, electrically-erasable programmable read only memory, and the like, a high-speed clock, analog-to-digital and digital-to-analog circuitry, and input/output circuitry and devices, and appropriate signal conditioning and buffer circuitry.

Control routines are executed by the controller 50 in response to input signals (arrow $CC_I$) from various sensors and/or networked control modules. As part of the present control strategy, the controller 50 is in communication with a motor control processor ("MCP") 50M of the electric machine 16, with the MCP 50M providing, either separately or as part of the control signals (arrow $CC_I$), a present state (arrow $S_{16}$) of the electric machine 16, including the operating temperature, running duration, and long-term torque limits thereof, as will be appreciated by those of ordinary skill in the art. An accelerator pedal 11 having a pedal sensor 11S measures and communicates an actual APS value (arrow APS) to the controller 50 as part of the present approach, with the actual APS value being a measured percentage of travel of the accelerator pedal ranging from 0% apply to 100% apply.

The term "controller" as used herein refers to one or more Application Specific Integrated Circuit(s) ("ASIC"), Field-Programmable Gate Array ("FPGA"), electronic circuit(s), central processing unit(s), e.g., microprocessor(s) and associated non-transitory memory component(s) in the form of memory (M) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Communication between the controller 50 and MCP 50M, other individual control modules of the vehicle 10 not specifically mentioned and/or depicted herein, and actuators and sensors used therewith, may be accomplished using a direct wired point-to-point link, a networked communication bus link, a wireless link or another suitable communication link. Communication may include exchanging data signals in suitable form, including transmitting electrical signals over a conductive medium, electromagnetic signals via air as a transmission medium, optical signals via optical waveguides, and the like. Data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as direct current ("DC"), alternating current ("AC"), sinusoidal-wave, triangular-wave, square-wave, vibration, and the like, that is capable of traveling through a medium. A parameter is defined herein as a measurable quantity that represents a physical property of a device or other element, and that is discernible using one or more sensors and/or a physical model. A parameter can have a discrete value, e.g., either "1" or "0", or the parameter can be infinitely variable in value.

Still referring to FIG. 1, the electric machine 16 is connected to an input shaft 17 of a transmission ("Trans") 18. Execution of instructions embodying the methods 100 and 200 by the controller 50 enables the controller 50, among other processes, to determine when to turn the engine 14 on (method 100) or off (method 200), and to thereby transition the powertrain 12 respectively out of or into an all-electric/electric vehicle ("EV") drive mode. As used herein and in the art, an EV drive mode is one in which input torque (arrow $T_I$) supplied to the transmission 18 is provided solely by motor torque (arrow $T_M$) from a rotor 16R of the electric machine 16. When the engine 14 is connected to the transmission 18, the electric machine 16 may provide the motor torque (arrow $T_M$) to the input member 17, while in other modes the engine 14 alone powers the transmission 18.

The powertrain 12 may include a hydrokinetic torque converter ("TC") 20 having an impeller/pump ("P") 22, a stator ("S") 21, and a turbine ("T") 26. The pump 22 is connected to and driven by the engine 14, for instance via an intervening flex plate 15. When the engine 14 is actively fueled and mechanically coupled to the input shaft 17 of the transmission 18 through the torque converter 20, the generated engine torque (arrow $T_E$) is fluidly transferred from the rotating pump 22, across the stator 21, and to the turbine 26. When the turbine 26 is connected to the input shaft 17, engine torque (arrow $T_E$) is made available as a contributor to the input torque (arrow $T_1$), either alone or in conjunction with the motor torque (arrow $T_M$) from the electric machine 16 depending on the operating mode.

An engine disconnect clutch 30 is optionally embodied herein as a passive one-way clutch ("OWC"). In such an embodiment, the engine disconnect clutch 30 is not a selectable or actively controllable device, and therefore its state is determined by the controller 50 as part of the method 200 of FIG. 6 using other values as explained below. The engine disconnect clutch 30 in some configurations may be an integral component of the torque converter assembly 20, as indicated by box 20A. An example of such an integral torque converter configuration is disclosed in U.S. Pat. No. 10,288,159 to Li et al., which is hereby incorporated by reference in its entirety. Also within the torque converter 20, the pump 22 may be selectively locked to the turbine 26 above a calibrated threshold rotational speed via operation of a torque converter clutch ("TCC") 28. A damper assembly ("DA") 29 may be disposed in series with the TCC 28 to effectively damp resultant noise, vibration, and harshness due to operation of the TCC 28.

In the illustrated embodiment of FIG. 1, the rotor shaft 16R of the electric machine 16 is connected to the input shaft 17 via a set of pulleys 32A and 32B and a drive element 32, e.g., a closed loop of chain or drive belt, or a suitable constructed gear set. Output torque (arrow $T_O$) from the transmission 18 is thereafter delivered to an output shaft 36 of the transmission 18. The output shaft 36 may be connected to a driven load, such as a final drive unit 38 and a set of drive wheels 40 in the exemplary application as part of the motor vehicle 10. An electric/auxiliary fluid pump ("$P_{AUX}$") 39 may draw an application suitable fluid from a sump 139, e.g., transmission fluid, and circulate the fluid to the transmission 18 when the engine 14 is not running, as will be appreciated by those of ordinary skill in the art. The state of the fluid pump 39 may be used as part of the method 200 in informing the engine-off decision, as set forth below with reference to FIG. 6. That is, the controller 50 is configured to ensure that the auxiliary pump 39 is running before disconnecting the engine 14 from the input shaft 17.

The electric machine 16 of FIG. 1 is embodied herein an electric motor/generator unit composed of an annular stator and rotor (not shown), with the rotor connected to the rotor shaft 16R to rotate in conjunction therewith. The rotor shaft 16R in turn is connected to one of the pulleys 32A, the rotation of which ultimately powers the transmission 18 in EV drive modes and other modes in which the electric machine 16 is used in conjunction with the engine 14. The electric machine 16 may be optionally embodied as a polyphase/AC machine drawing power from a traction power inverter module ("TPIM") 42 and a high-voltage battery pack ("$B_{HV}$") 44, with "high-voltage" being an application specific value, e.g., 60V in some embodiments or 300V or more in others.

In such an embodiment, an AC voltage ("VAC") powers phase windings of the electric machine 16 on an AC side of the TPIM 42, while a DC voltage ("VDC") is present on a DC side of the TPIM 42, i.e., a high-voltage bus. A DC-DC converter ("DC-DC") 45 may be connected to such a high-voltage bus as shown and configured to reduce the DC bus voltage, e.g., to 12-15V auxiliary levels ("$V_{AUX}$") for storage in an auxiliary battery ("$B_{AUX}$") 46, for instance a lead-acid battery.

Figure 2:
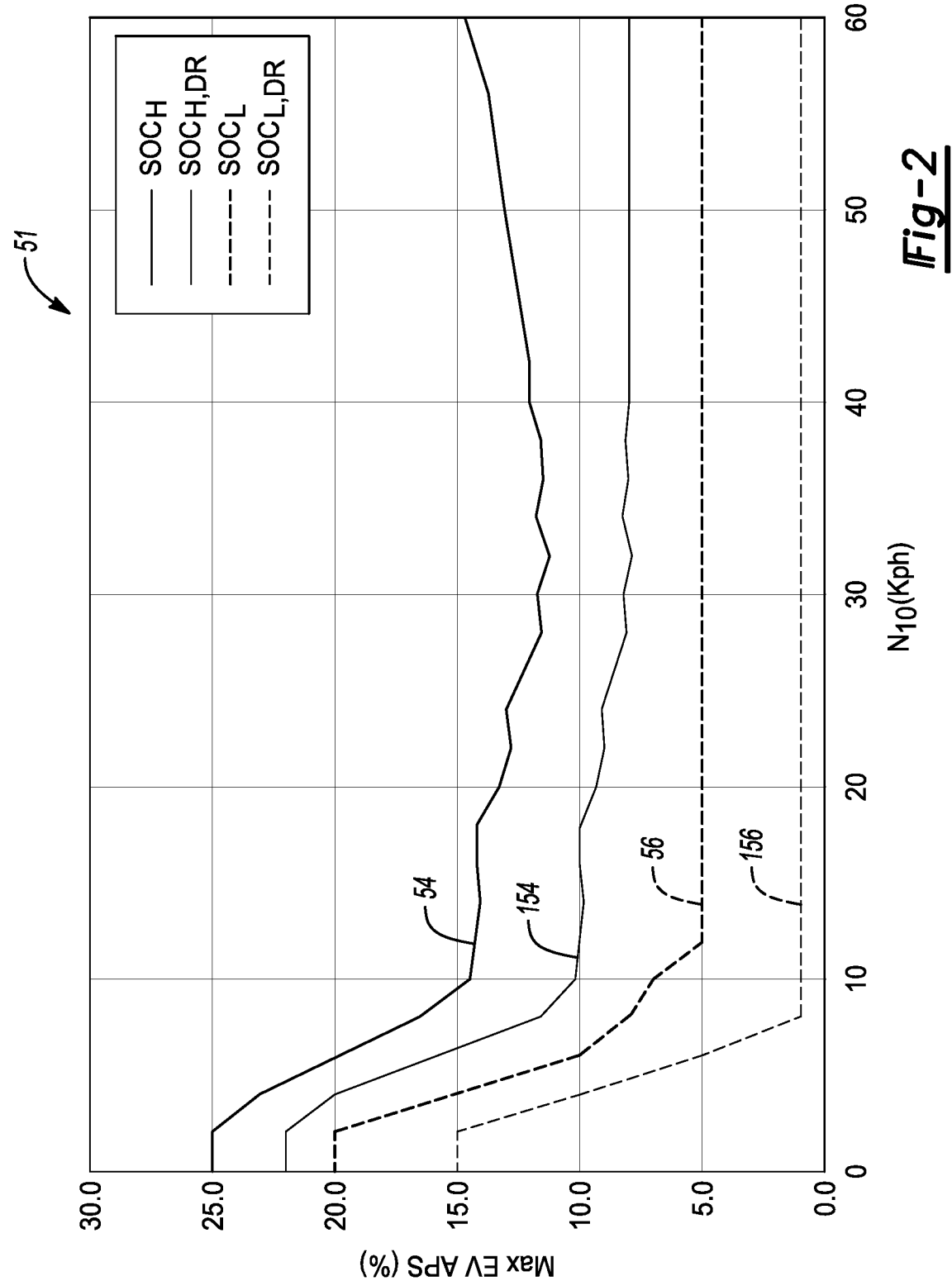
FIG. 2 is a set of traces depicting maximum electric vehicle accelerator position signal ("$EV_{APS}$") as a percentage of apply on the vertical axis, and vehicle ground speed in kilometers per hour on the horizontal axis.

Referring to FIG. 2, a representative plot 51 includes traces 54, 154, 56, and 156 describing representative maximum EV accelerator pedal signal ("Max EV APS") drive limits as a percentage (%) of maximum pedal travel of the accelerator pedal 11 (FIG. 1) on the vertical axis. Vehicle ground speed ("$N_{10}$") is depicted in kilometers per hour ("kph") on the horizontal axis. In general, plot 51 illustrates that the max EV APS quantity considered herein is a function of ground speed, along with SOC of the battery pack 44 of FIG. 1 as described below with reference to FIG. 3.

The method 100 described next with reference to FIG. 4 involves the selective and real-time de-rating of the $EV_{APS}$ drive limits based on various factors. For instance, a battery pack 44 having a relatively high SOC may have a corresponding EV APS drive limit as represented by trace 54 ("$SOC_H$"). For instance, if an operator of the vehicle 10 of FIG. 1 were to apply more than 25% pedal apply at a ground speed of about 2 kph, the controller 50 would treat this input as requiring some amount of engine torque (arrow $T_E$ of FIG. 1), thus potentially triggering an engine-connected event. Trace 154 ("$SOC_{H,DR}$") corresponds to a temperature de-rated variant of trace 54, with trace 154 having a lower engine-connected operating point relative to trace 54 in terms of pedal apply percentage. Traces 56 and 156 similarly illustrate representative low-SOC EV APS drive limits, with trace 156 ("$SOC_{L,DR}$") being temperature de-rated and trace 56 ("SOCL") being a nominal $EV_{APS}$ drive limit.

Figure 3:
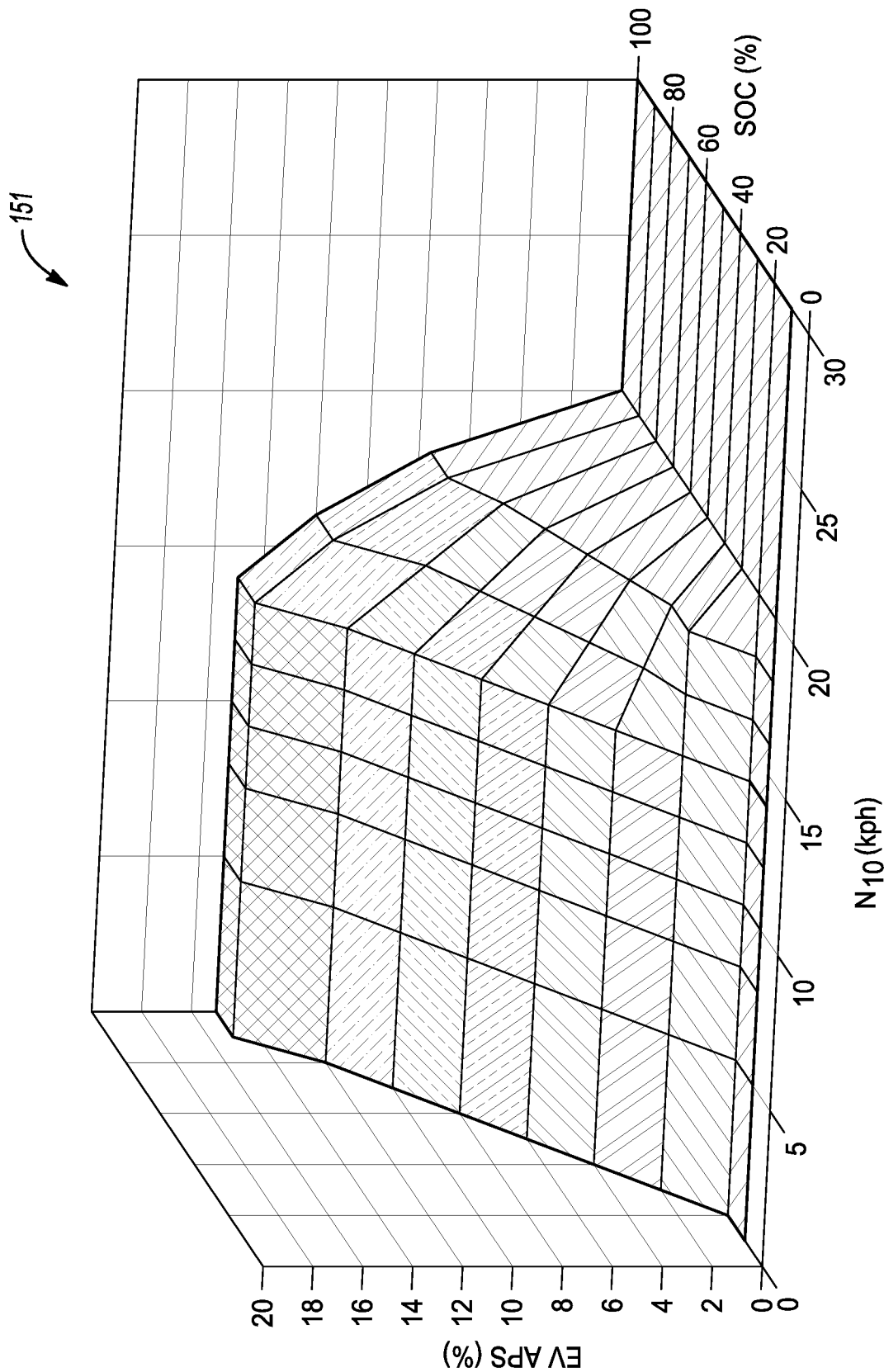
FIG. 3 is an exemplary three-axis plot of maximum $EV_{APS}$, vehicle ground speed, and state of charge of a battery pack of the exemplary powertrain shown in FIG. 1.

As noted above in the simplified two-axis depiction in FIG. 2, SOC of the battery pack 44 is a factor in determining appropriate EV APS drive limits according to the present disclosure. Surface 151 of FIG. 3 shows an exemplary relationship between nominal (i.e., not de-rated) EV APS drive limits as a percentage, vehicle ground speed, and SOC as a percentage. That is, a higher SOC generally corresponds to a higher EV APS drive limit within a lower speed range of the vehicle 10, e.g., 0-20 kph.

Engine-Connected Decision

FIG. 4 describes an exemplary embodiment of the method 100 noted above. Execution of instructions embodying the method 100 allows the controller 50 to determine when to turn the engine 14 on, and ultimately to connect the engine 14 to the input shaft 17 of the transmission 18.

Commencing with block B102, the controller 50 determines the current vehicle ground speed (Nm) and compares the ground speed value to a calibrated maximum EV speed ($EV_{MAX}$), for instance a discrete threshold speed of about 12 kph up to about 20 kph. When vehicle ground speed ($N_{10}$) is less than the maximum EV speed ("$N_{10} < EV_{MAX}$"), the method 100 proceeds to block B104. When the vehicle ground speed ($N_{10}$) exceeds the maximum EV speed, however, the method 100 instead proceeds to block B112.

Block B104 entails determining the current operating temperature of the TPIM 42 of FIG. 1 as part of the control signals (arrow $CC_1$), with such a value referred to herein as the inverter temperature ("$T_{INV}$"). The controller 50 is periodically apprised of the inverter temperature as part of the ongoing monitoring of the states of the various components of the powertrain 12, and thus is able to compare this value to a calibrated temperature limit ("$T_{LIM}$"). The method 100 proceeds to block B105 when the inverter temperature is less than the calibrated temperature limit. When the inverter temperature exceeds the temperature limit ("$T_{INV} > T_{LIM}$"), the method 100 proceeds instead to block B106.

Blocks B105 and B106 include receiving the present vehicle ground speed ($N_{10}$) and the present SOC of the battery pack 44 of FIG. 1, with the latter possibly periodically calculated by a dedicated battery system manager using information from a cell sense circuit (not shown) associated with the battery pack 44, as will be appreciated, and then referencing respective nominal and temperature de-rated calibrated maximum $EV_{APS}$ lookup tables previously recorded in memory (M) of the controller 50. In block B105, reached when the TPIM 42 is not excessively hot relative to the calibrated temperature limit, the controller 50 selects a calibrated maximum $EV_{APS}$ value ("$EV_{APS}$ CAL") from the nominal lookup table noted above. Such a table may, for instance, output a value from one of the representative traces 54 or 56 of FIG. 2, with the actual values of traces 54 and 56 varying with the application. In block B106, when the inverter temperature exceeds the above-noted temperature threshold, the controller 50 extracts a value ("$EV_{APS}$*CAL") from the temperature de-rated lookup table, e.g., from traces 154 or 156 of FIG. 2 or an application-specific variation thereof.

The output of one of the two lookup tables from blocks B105 or B106 is then used in block B108 as the maximum $EV_{APS}$ value, i.e., a percentage amount of pedal apply or pedal travel of the accelerator pedal 11 shown in FIG. 1 above which the controller 50 would turn on and connect the engine 14 to the transmission 18. However, pending execution of the remainder of the method 100, the controller 50 may adjust the maximum $EV_{APS}$ value from block B105 or B106 downward or upward as needed, with state information from the MCP 50M used by the controller 50 to make this further determination and possible adjustment.

That is, block B108 receives the maximum $EV_{APS}$ value from block B105 or B106 based on the result of the comparison conducted at block B104. Also at block B108, the controller 50 receives the actual APS level (arrow APS) output by the pedal sensor 11S of FIG. 1. For instance, if an operator of the vehicle 10 were to depress the accelerator pedal 11 to 20% of its maximum amount of travel, the actual APS level communicated to the controller 50 would be 20%.

Additionally as part of block B108, the controller 50 derives a scaled APS value as a scaled variant of the above-noted maximum $EV_{APS}$ value selected from one of the tables. To this end, the controller 50 may calculate an APS scale factor (arrow $APS_{SF}$) based on a state of the electric machine 16 as explained below. That is, the controller 50 receives the state information (arrow $S_{16}$ of FIG. 1) as reported by the MCP 50M, with example state information including the long-term torque limits and a peak torque capability of the electric machine 16. As will be appreciated, such values are determined in real-time by the MCP 50M, e.g., as a function of the temperature and elapsed time of operation of the electric machine 16 and its associated power electronics.

In an embodiment, the APS scale factor (arrow $APS_{SF}$) may be derived by the controller 50 as follows:

$$APS_{SF} = \frac{\text{Long-Term Torque Limit}}{\text{Peak Torque}}$$

i.e., the long-term torque limit of the electric machine 16 divided by the peak torque of the electric machine 16. Block B108 may then calculate a delta APS value, abbreviated herein as ΔAPS, by performing the following operation:

$$\Delta APS = APS - APS_{SF} \times EV_{APS}$$

The ΔAPS value is then used as an input to block B110.

At block B110, the controller 50 next compares the ΔAPS value from block B108 to a low calibrated ΔAPS minimum limit, e.g., 0 or 0.1, to see if the actual pedal request from the operator indicated by the actual APS varies meaningfully from the maximum $EV_{APS}$ value from blocks B105 or B106, as modified by the MCP 50M-informed APS scale factor. When the ΔAPS value exceeds the minimum limit ("ΔAPS>min"), the method 100 proceeds to block B112. Otherwise, the method 100 returns to block B102, effectively remaining in the EV drive mode through another iteration of the method 100.

Block B112 includes transmitting an engine-connected request ("REQ E(14) CONN") from the controller 50 to an engine control unit, or to associated logic of the controller 50 when the controller 50 is configured to control operation of the engine 14. The method 100 then proceeds to block B114.

Block B114 may entail determining whether a prior-requested shift or other speed ratio change of the transmission 18 is currently in progress ("(18) SHFT?"). If the shift or speed ratio change is not in progress, the method 100 proceeds to block B116. Otherwise, the method 100 returns to block B102 and remains in EV drive mode for another iteration of method 100.

At block B116, the method 100 includes connecting the engine 14 to the input member 17 of the transmission 18 shown in FIG. 1. Depending on the particular configuration of the powertrain 12 of FIG. 1, block B116 may entail closing the engine disconnect clutch 30 and, at an appropriate low-slip point of the torque converter 20, thereafter engaging the TCC 28 to lock the pump 22 to the turbine 26. When the TC 20 is not used, the engine 14 may be connected via a plate clutch or other suitable torque transfer device.

Figure 5:
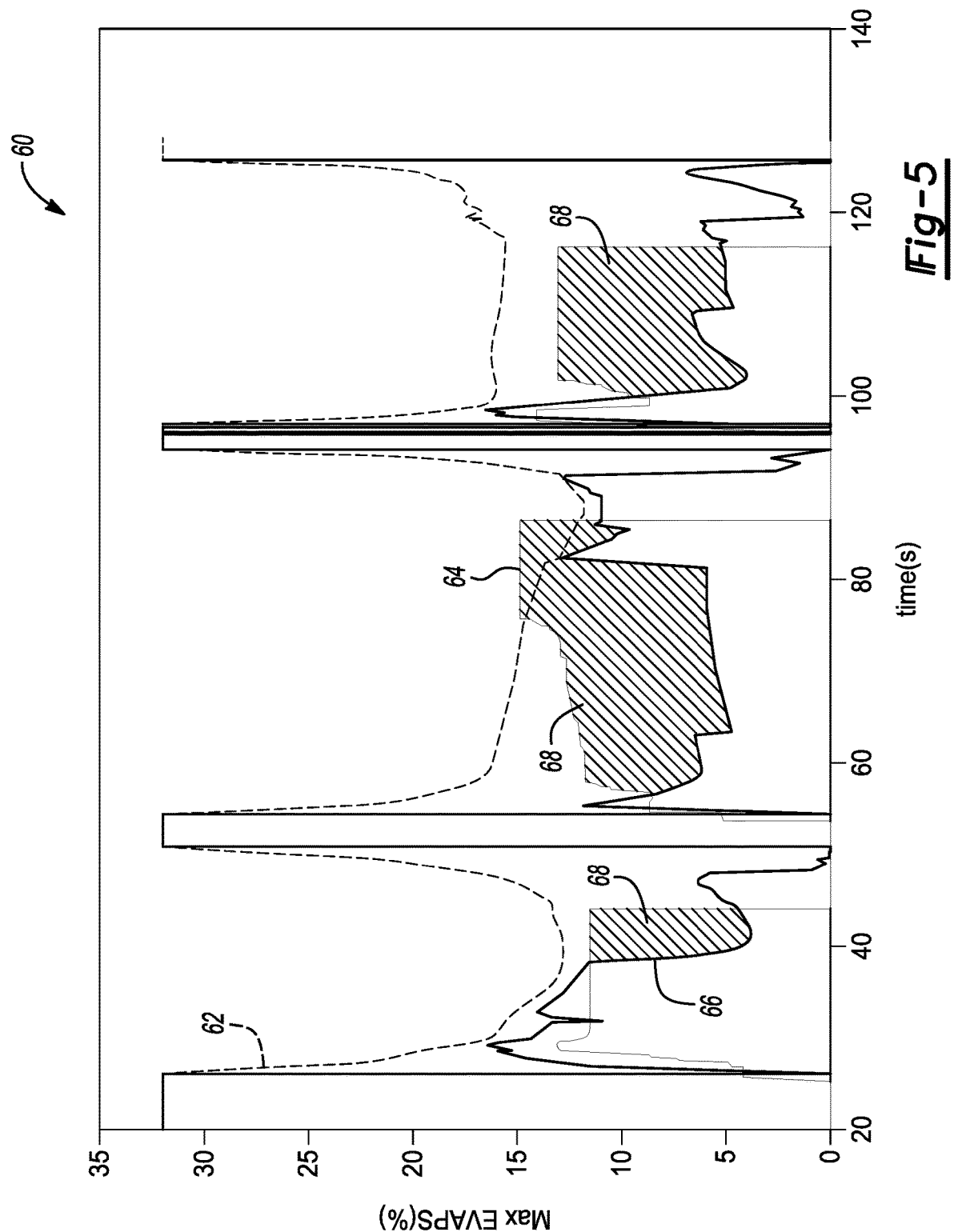
FIG. 5 is a set of traces describing various APS signals and limits, with percentage APS depicted on the vertical axis and time in seconds depicted on the horizontal axis.

Referring briefly to FIG. 5, a set of traces 60 describes three different APS limits, with percentage (%) limits depicted on the vertical axis and time in seconds (s) depicted on the horizontal axis. Trace 62 represents a calibrated maximum APS level above which the controller 50 would ordinarily request fueling of the engine 14 of FIG. 1 and connection of the engine 14 to the transmission 18. The present methods 100 and 200 allow the controller 50 to determine when to turn the engine 14 on or off, respectively, as well as how to determine how and to what extent to adjust the nominal limits of trace 62.

In the exemplary traces 60, trace 64 represents the actual APS noted above, i.e., the operator's actual amount of applied travel to the accelerator pedal 11 of FIG. 1. For example, the vehicle 10 may be at a standstill until around t=25 s, at which point the operator depresses the accelerator pedal 11 with 12-13% pedal travel. In the course of executing method 100 as explained above, the controller 50 may use a temperature de-rated variation of the EV APS of trace 62, e.g., based on the inverter temperature. The result of method 100 may be a dynamically-adjusted EV APS (trace 66). Looking at shaded regions 68, for instance, the actual APS sometimes exceeds the dynamically-adjusted EV APS (trace 66). The controller 50 of FIG. 1 would therefore treat this scenario as requiring active fueling and connection of the engine 14 in order to supplement motor torque (arrow $T_M$) from the electric machine 16 with engine torque (arrow $T_E$) from the engine 14.

Engine-Off Decision

FIG. 6 describes an exemplary embodiment of the method 200, with method 200 commencing when the engine 14 is on and connected to the transmission 18. Execution of instructions embodying the method 200 allows the controller 50 to determine when to turn the engine 14 off and ultimately disconnect the engine 14 from the input shaft 17 of the transmission 18. Such an action results in entry into an EV drive mode.

Commencing with block B202, the controller 50 determines the current vehicle ground speed ($N_{10}$) and compares the ground speed value to a calibrated maximum EV speed ($EV_{MAX}$), with block B102 being analogous to block B102 of FIG. 4. When the vehicle ground speed is less than the maximum EV speed ("$N_{10}<EV_{MAX}$"), the method 100 proceeds to block B204. Otherwise, the method 100 proceeds instead to block B203 when the vehicle ground speed exceeds the maximum EV speed.

Block B203 entails keeping the engine 14 connected to the transmission 18 ("E(14)=CONN"). The powertrain 12 therefore remains in an engine-connected drive mode for another iteration of method 200.

Block B204 is analogous to block B104 of FIG. 4, and entails determining the inverter temperature ("$T_{INV}$") and comparing this value to the above-noted calibrated temperature limit ("$T_{LIM}$"). The method 100 proceeds to block B203 when the inverter temperature exceeds the calibrated temperature limit. When the inverter temperature is less than the temperature limit ("$T_{INV}<T_{LIM}$"), the method 100 proceeds instead to block B206.

At block B206, the controller 50 compares the present SOC of the battery pack 44 shown in FIG. 1 to a calibrated low SOC limit ("SOC>$SOC_L$?"). The method 200 proceeds to block B208 when the current SOC exceeds the calibrated low SOC limit, and to block B203 in the alternative.

Block B208 receives the vehicle ground speed ($N_{10}$) as an input, and references a calibrated lookup table to determine a corresponding engine disconnect acceleration limit ("E (14) DISCONN ACCEL"). As will be appreciated, acceleration events of the type occurring in the powertrain 12 and vehicle 10 when informing the controller 50 as to when to turn the engine 14 off refers to negative acceleration, i.e., deceleration.

Figure 7:
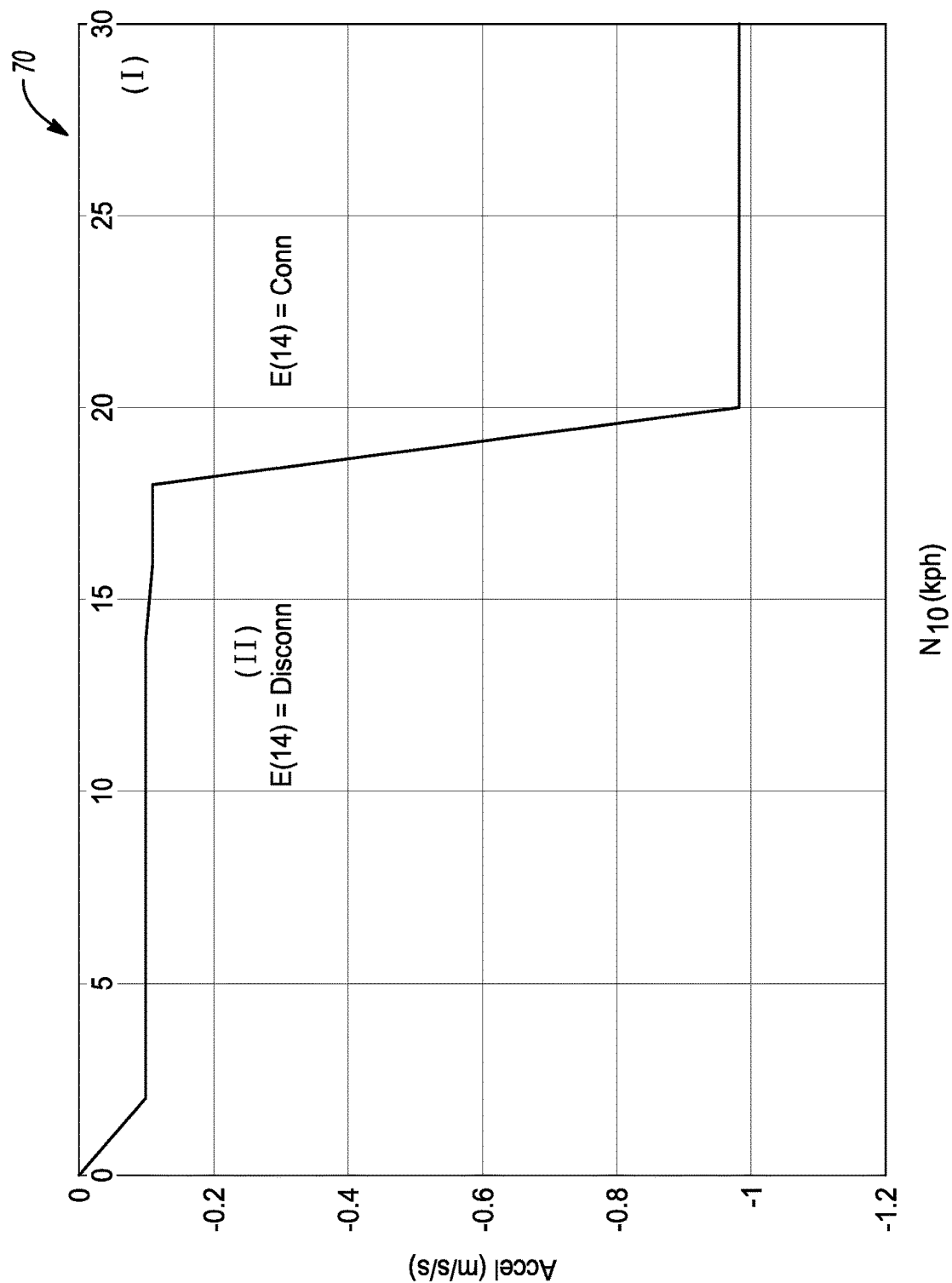
FIG. 7 is a plot of vehicle acceleration in meters per second per second ("m/s/s") on the vertical axis and vehicle ground speed in kilometers per hour on the horizontal axis.

Referring briefly to FIG. 7, trace 70 illustrates an example of such an engine disconnect acceleration limit, with the acceleration in m/s/s depicted on the vertical axis and vehicle ground speed ($N_{10}$) in kph depicted on the horizontal axis. Regions (1) and (2) are defined respectively above and below trace 70. In Region (1), the engine 14 of FIG. 1 remains connected to the input member 17 of the transmission 18 ("E(14) =CONN"). Below trace 70, i.e., in Region (2), the engine 14 may be disconnected ("E(14) =DISCONN").

In block B208 of FIG. 6, therefore, the controller 50 may identify, from the above-noted lookup table, the particular acceleration limit ("$ACCEL_{LIM}$") that corresponds to current vehicle ground speed ($N_{10}$). The corresponding acceleration limit is thereafter used as an input in block B210. The method 200 proceeds to block B210.

Block B209 is executed simultaneously with block B208. In block B209, the controller 50 determines the current acceleration (arrow $ACCEL_{10}$) of the vehicle 10 of FIG. 1, e.g., determined using accelerometers or via calculation, and feeds this value into a low-pass filter ("LPF") and/or other limiter to reduce transient noise. A filtered acceleration (arrow $ACC_{FILT}$) is thereafter fed as another input to block B210. The method 200 then proceeds to block B210.

At block B210, the controller 50 subtracts the output of block B208 from the output of block B209, i.e.,:

$$\Delta ACC = ACC_{LIM} - ACC_{FILT}$$

with the result, ΔACC, referred to herein as a "delta acceleration value" and used as an input to block B212. The method 200 then proceeds to block 212.

At block B212, the controller 50 compares the delta acceleration value from block B210 to a calibrated delta acceleration threshold ("ΔACC<CAL?"), and then proceeds to block B214 for ultimate disconnection of the engine 14 when the delta acceleration value is less than the calibrated delta acceleration threshold. The controller 50 proceeds instead to block B203 when the delta acceleration value from block B210 exceeds the threshold.

Block B214 may optionally include initiating an engine disconnect timer to start counting through a calibrated delay interval, e.g., 2-3 s. The purpose of block B214 is to avoid reacting to transient deceleration conditions, such as the vehicle 10 running over a bump or pothole. The controller 50 proceeds to block B216 after initiating the engine disconnect timer.

Block B216 includes determining if the engine disconnect timer started at block B216 has expired. The method 200 proceeds to block B212 when the timer has not yet expired, and to block B218 in the alternative.

At block B218, the controller 50 determines if the actual APS is zero, i.e., that the accelerator pedal 11 shown in FIG. 1 is not currently being applied. The method 200 proceeds to block B220 when the APS is zero ("APS=0?"), or within a very low tolerable range thereof indicative of the driver having released the accelerator pedal 11, and to block B203 when the APS is positive.

At block B220, the controller 50 requests the disconnection of the engine 14 of FIG. 1 ("REQ E(14) DISCONN").

Block 220 is reached when the above-described delta acceleration value is less than the delta acceleration threshold. Block B220 may entail transmitting an engine disconnect signal to a separate engine control module, for instance. The method 200 thereafter proceeds to block B222.

Block B222 may include determining, via the controller 50, whether a shift of the transmission 18 is in progress. The method 200 proceeds to block B224 when such a shift is not in progress. When a shift of the transmission 18 is in progress, the method 200 proceeds instead to block B203.

At block B224, the controller 50 may determine the state of the auxiliary fluid pump 39 and TCC 28 of FIG. 1 to verify that conditions are suitable for disconnecting the engine 14. For instance, the controller 50 may verify the speed of the auxiliary fluid pump 39 to ensure that the fluid pump 39 has started and thus is ready to commence pressurization of the transmission 18. Likewise, block B224 may entail ensuring or otherwise verifying that the TCC 28 has been disengaged/opened, such that subsequent disconnection of the engine 14 will not result in a perceptible driveline disturbance. The method 200 then proceeds to block B226.

At block B226, the controller 50 commands disconnection of the engine 14 from the transmission 18. Block B226 entails opening the engine disconnect clutch 30 of FIG. 1 such that, even if the engine 14 is still spinning, engine torque (arrow $T_E$) is not transferred to the input member 17 of the transmission 18.

As will be appreciated by those of ordinary skill in the art in view of the foregoing disclosure, the present methods 100 and 200 allow the controller 50 of FIG. 1 to control an engine on/off decision aboard the exemplary vehicle 10 in a manner that improves fuel economy, and that provides less intrusive engine state transitions relative to cost function-based loss minimization strategies. Execution of the methods 100 and 200 also provides improved drivability while more closely matching component limitations of the powertrain 12. Controller 50 may be used as part of a hybrid control system configured to dynamically expand or contact an engine-off driving envelope in response to an operator's pedal request or the deceleration rate of the vehicle 10, as well as other factors such as dynamic motor torque limits, inverter temperature, and SOC of the battery pack 44. These and other benefits are realized using the present teachings as set forth above with reference to the various Figures.

Aspects of the present disclosure have been described in general terms and in detail with reference to the illustrated embodiments. Various modifications can be made by those skilled in the art without departing from the scope and spirit of the described embodiments. One skilled in the relevant art will also recognize that the disclosed methods and supporting hardware implementations may be alternatively embodied in other specific forms without departing from the scope of the disclosure. Therefore, the foregoing disclosure is intended to be illustrative of the present teachings without limiting of the inventive scope defined solely by the appended claims.

What is claimed is:

1. A method for controlling a hybrid electric powertrain of a motor vehicle, the hybrid electric powertrain including an internal combustion engine selectively connectable to an input shaft of a transmission via an engine disconnect clutch, a rotary electric machine directly connected to transmission, a high-voltage battery pack, a traction power inverter module ("TPIM") connected to the battery pack and the electric machine, and a controller, the method comprising:
   determining, via the controller, a ground speed of the vehicle, a state of charge ("SOC") of the battery pack, an inverter temperature of the TPIM, and an actual accelerator position signal ("APS") level indicative of a percentage accelerator pedal request;

in response to the ground speed being less than a calibrated maximum electric vehicle accelerator pedal signal ("$EV_{APS}$") level above which torque from the engine is required:

calculating a delta APS ("$\Delta APS$") value by subtracting a scaled APS value from the actual APS level, wherein the scaled APS value is a scaled variant of a maximum $EV_{APS}$ value selected from a maximum $EVS_{APS}$ table, the maximum $EVS_{APS}$ table being populated based on the inverter temperature, the state of charge, and the ground speed; and in response to the $\Delta APS$ value exceeding a calibrated $\Delta APS$ threshold, connecting the engine to the input shaft of the transmission by commanding the engine disconnect clutch to close.

2. The method of claim 1, wherein calculating the $\Delta APS$ value includes solving the equation:

$$\Delta APS = APS - (APS_{SF})(EV_{APS})$$

where APS is the actual APS level, $APS_{SF}$ is an APS scale factor that is based on a state of the electric machine, and $EV_{APS}$ is the maximum $EV_{APS}$ value.

3. The method of claim 2, wherein the state of the electric machine includes a long-term torque limit and a peak torque of the electric machine, and wherein the scale factor is determined by dividing the long-term torque limit by the peak torque.

4. The method of clam 3, wherein the electric machine includes a motor control processor ("MCP"), the method further comprising:

communicating the long-term torque limit and the peak torque to the controller via the MCP.

5. The method of claim 1, the method further comprising:
selecting the maximum $EV_{APS}$ value from a nominal maximum $EVS_{APS}$ table when the inverter temperature is less than a calibrated temperature threshold; and
selecting the maximum $EV_{APS}$ value from a temperature de-rated maximum $EVS_{APS}$ table, via the controller, when the inverter temperature exceeds the calibrated temperature threshold.

6. The method of claim 1, wherein the controller is configured to determine whether a shift of the transmission is in progress, and to temporarily delay connecting the engine to the input shaft of the transmission until the shift of the transmission has completed.

7. The method of claim 1, the method further comprising, when the engine is connected to the input shaft, the ground speed is less than the calibrated maximum $EV_{APS}$ level, the inverter temperature is less than a temperature limit, and the SOC exceeds a low SOC threshold:

determining an engine disconnect acceleration limit from a lookup table using the ground speed;
determining a filtered acceleration of the vehicle by passing a current acceleration of the vehicle through a low-pass filter;
calculating a delta acceleration value as a difference between the engine disconnect acceleration limit and the filtered acceleration; and
disconnecting the engine from the input shaft via the controller only when the delta acceleration value is less than a delta acceleration threshold and the actual APS level is zero.

8. The method of claim 7, the method further comprising:
initiating an engine disconnect timer when the delta acceleration value is less than the delta acceleration threshold; and
disconnecting the engine from the input shaft occurs after the engine disconnect timer has expired.

9. The method of claim 7, wherein the powertrain includes a hydrokinetic torque converter disposed between the engine and the input shaft, the method further comprising:
releasing a torque converter clutch of the hydrokinetic torque converter via the controller before disconnecting the engine from the input shaft.

10. The method of claim 7, wherein the powertrain includes an auxiliary pump configured to supply fluid to the transmission when the engine is not running, the method further comprising:
ensuring that the auxiliary pump is running, via the controller, before disconnecting the engine from the input shaft.

11. A hybrid electric powertrain for a motor vehicle, comprising:
an internal combustion engine;
a transmission having an input shaft;
an engine disconnect clutch configured to selectively connect the engine to the input shaft when closed and disconnect the engine from the input shaft when opened;
a rotary electric machine directly connected to the input shaft of the transmission;
a high-voltage battery pack;
a traction power inverter module ("TPIM") connected to the battery pack and to the electric machine, and configured to invert a DC voltage from the battery pack into an AC voltage for powering the electric machine; and
a controller configured to execute instructions to thereby cause the controller to:
determine a ground speed of the vehicle, a state of charge ("SOC") of the battery pack, an inverter temperature of the TPIM, and an actual accelerator position signal ("APS") level indicative of a percentage accelerator pedal request; and
in response to the ground speed being less than a calibrated maximum electric vehicle accelerator pedal signal ("$EV_{APS}$") level above which torque from the engine is required:
calculate a delta APS ("$\Delta APS$") value by subtracting a scaled APS value from the actual APS level, wherein the scaled APS value is a scaled variant of a maximum $EV_{APS}$ value selected from a maximum $EVS_{APS}$ table, the maximum $EVS_{APS}$ table being populated based on the inverter temperature, the state of charge, and the ground speed; and
in response to the $\Delta APS$ value exceeding a calibrated $\Delta APS$ threshold, connect the engine to the input shaft of the transmission by commanding the engine disconnect clutch to close.

12. The powertrain of claim 11, wherein the controller is configured to calculate the $\Delta APS$ value by solving the equation:

$$\Delta APS = APS - (APS_{SF})(EV_{APS})$$

where APS is the actual APS level, $APS_{SF}$ is an APS scale factor that is based on a state of the electric machine, and $EV_{APS}$ is the maximum $EV_{APS}$ value.

13. The powertrain of claim 12, wherein the state of the electric machine includes a long-term torque limit and a peak torque of the electric machine, and wherein the scale factor is determined by dividing the long-term torque limit by the peak torque.

14. The powertrain of claim 13, wherein the electric machine includes a motor control processor ("MCP") configured to communicate the long-term torque limit and the peak torque to the controller.

15. The powertrain of claim 11, wherein the controller is further configured to:
select the maximum $EV_{APS}$ value from a nominal maximum $EVS_{APS}$ table when the inverter temperature is less than a calibrated temperature threshold; and
select the maximum $EV_{APS}$ value from a temperature de-rated maximum $EVS_{APS}$ table when the inverter temperature exceeds the calibrated temperature threshold.

16. The powertrain of claim 11, wherein the controller is further configured to determine whether a shift of the transmission is in progress, and to temporarily delay connecting the engine to the input shaft of the transmission until the shift of the transmission has completed.

17. The powertrain of claim 11, wherein the controller is further configured, when the engine is connected to the input shaft, the ground speed is less than the calibrated maximum $EV_{APS}$ level, the inverter temperature is less than a temperature limit, and the SOC exceeds a low SOC threshold, to:
determine an engine disconnect acceleration limit from a lookup table using the ground speed;
determine a filtered acceleration of the vehicle by passing a current acceleration of the vehicle through a low-pass filter;
calculate a delta acceleration value as a difference between the engine disconnect acceleration limit and the filtered acceleration; and
disconnect the engine from the input shaft via the controller only when the delta acceleration value is less than a delta acceleration threshold and the actual APS level is zero.

18. The powertrain of claim 17, wherein the controller is further configured to:
initiate an engine disconnect timer when the delta acceleration value is less than the delta acceleration threshold; and
disconnect the engine from the input shaft by opening the engine disconnect clutch after the engine disconnect timer has expired.

19. The powertrain of claim 17, further comprising a hydrokinetic torque converter disposed between the engine and the input shaft, wherein the controller is further configured to release a torque converter clutch of the hydrokinetic torque converter via the controller before disconnecting the engine from the input shaft.

20. The powertrain of claim 17, further comprising an auxiliary pump configured to supply a fluid to the transmission when the engine is not running, wherein the controller is further configured to ensure that the auxiliary pump is running before disconnecting the engine from the input shaft.

* * * * *